May 31, 1960  F. L. TRUMP  2,938,688
RETRACTABLE RECEPTACLE FOR FLIGHT REFUELING
Filed Sept. 3, 1954  6 Sheets-Sheet 1

INVENTOR.
Frederic L. Trump
BY
John J. Sullivan
ATTORNEY.

May 31, 1960 F. L. TRUMP 2,938,688
RETRACTABLE RECEPTACLE FOR FLIGHT REFUELING
Filed Sept. 3, 1954 6 Sheets-Sheet 2

INVENTOR.
Frederic L. Trump
BY
ATTORNEY.

FIG. 4

May 31, 1960   F. L. TRUMP   2,938,688
RETRACTABLE RECEPTACLE FOR FLIGHT REFUELING
Filed Sept. 3, 1954   6 Sheets-Sheet 5

INVENTOR.
Frederic L. Trump
BY
John J. Sullivan
ATTORNEY.

600;2,938,688
Patented May 31, 1960

United States Patent Office 2,938,688

RETRACTABLE RECEPTACLE FOR FLIGHT REFUELING

Frederic L. Trump, Roslyn, N.Y., assignor to Republic Aviation Corporation, Farmingdale, N.Y., a corporation of Delaware Filed Sept. 3, 1954, Ser. No. 454,101

13 Claims. (Cl. 244—135)

This invention relates to receptacles or receivers for the nozzle of a fuel supply line and more particularly to such a receptacle or receiver for use on aircraft, whereby fuel may be transferred to the aircraft especially during flight and which, when not in operation, may be retracted completely within the aircraft to preserve the smooth and uninterrupted aerodynamic contour thereof.

The present invention proposes a receptacle or receiver including means by which it is normally closed and sealed against the passage or leakage of fuel therethrough. However, it is designed to open and permit the passage of fuel when the nozzle is operatively inserted and engaged in locking connection therein. When operatively connected to the receptacle or receiver the nozzle cannot readily be withdrawn while fuel is being transferred to the aircraft.

If and when this locking connection or engagement is broken, however, the instant receptacle is designed to automatically close and seal itself against the passage or leakage of fuel.

Among its other objects the instant invention has in view a retractable receptacle or receiver so mounted and arranged in and on an aircraft component, such as the wing, fuselage, etc., that when extended it is so disposed for cooperation with reference to the outer surface of the component, that said surface serves as a platform and guide or slipway for the nozzle to facilitate its insertion in the receiver.

An additional means is provided as an integral part of the receptacle to inform the pilot or operator of the aircraft when the nozzle is operatively engaged by the receptacle. After the fuel has been transferred and the nozzle withdrawn from the receptacle, the entire receptacle is retracted into the component to form a smooth and flush continuation of the outer surface thereof.

With the above and other objects in view, as will be apparent, this invention consists in the construction, combination and arrangement of parts, all as hereinafter more fully described, claimed and illustrated in the accompanying drawings, wherein:

While the basic idea of refueling an aircraft in flight, whereby an increase in pay load and/or range may be attained, is in and of itself old, the production of a safe and practical means to this end has given rise to many problems. Until the development and production of present day high speed jet aircraft little or not effort was spent on the design and perfection of such means and even today large, bulky and otherwise objectionable devices have been employed.

As is well-known, and this is particularly true of military aircraft, the space requirements within the airframe are limited, and become increasingly more stringent, due in part to the ever increasing relative thinness of the wings thereof together with the increase of equipment and instruments which must be stored therein. Thus, in the modern jet fighter aircraft internal space available for internal fuel tanks, etc. has decreased even though the higher powered engines employed consume increasingly larger quantities of fuel.

At the same time, and this is again particularly true of military aircraft, it is desirable to present clean and smooth lines or aerodynamic surfaces for increased speed and maneuverability.

It is toward the solution of the above as well as other problems that the present invention is directed. To this end this invention proposes a retractable receiver which is hinged to a component, for example, the wing of an aircraft. When this receiver is protracted it extends angularly from the component or wing whereby that portion of the wing ahead or in front of the receiver serves as a platform and guide or slipway to facilitate the insertion of the nozzle of the fuel supply line into the receiver. When the nozzle is operatively engaged by the receiver, means which form a unitary part of the receiver are provided to automatically lock it therein. When the receiver is not in operation, it may be retracted within the component or wing whereby the outer cover of the receiver completely fills and closes the opening in the wing through which the receiver was protracted to receive the nozzle. In this position of the receiver the aerodynamic surface of the component or wing is smooth and unbroken.

Additionally the invention includes means automatically and simultaneously operative upon the rotation of the receiver to and from its protracted position for positively locking and retaining the receiver in either of its extreme positions of protraction or retraction.

Since a portion of the wing or component is employed by the present invention as a platform or slipway and guide for the nozzle, the size of the entire receiver is materially reduced and requires a minimum of space for storage within the component. At the same time, due to the flush retraction of the receiver within the component, the smooth, aerodynamic lines of the aircraft are preserved when the receiver is not in operation whereby the performance, i.e., speed and maneuverability of the aircraft, is not adversely or undesirably affected.

Figure 1:
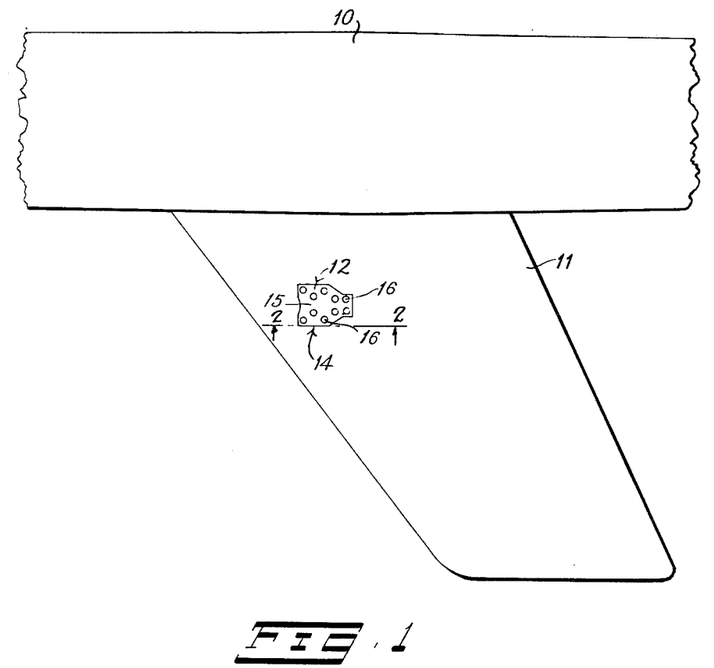
Fig. 1 is a plan elevation of a fragmentary portion of an aircraft fuselage and one of the wings associated therewith to show the manner in which a retractable receiver or receptacle constructed according to this invention may be mounted in the wing.

Reference being had now more particularly to the drawings, 10 designates a fragmentary portion of the fuselage of an airplane having a wing 11, here shown as being swept back, projecting therefrom. A receptacle or receiver generally designated by the numeral 12, constructed in accordance with the teachings of this invention, is mounted in the wing 11 with its upper surface normally in flush association with the upper surface or skin of the wing aft of the leading edge thereof. The receiver 12 is arranged and adapted for rotary movement relative to the wing 11 to and from its normal position aforesaid whereby it may receive the nozzle N of a fuel line from a supply aircraft or tanker (not shown) for refueling the airplane 10.

To this end the receiver 12 is fixedly secured to, and carried by, a journal 13 at the aft end of the receiver and the journal, in turn, is mounted for rotation in any suitable manner such as for example in one or more bearings 13' fixed to structure forming an immovable part of the airframe.

An opening 14 is provided in the skin of the wing 11 which conforms in shape and area to a cover plate or sheet 15 which is fixedly attached to the upper side of the receiver 12 in any convenient manner, e.g. by a plurality of bolts 16. This cover 15 is so mounted on the receiver 12 that its outer surface lies flush with the outer surface of the skin of the wing 11 so as to present a smooth and uninterrupted continuation thereof when it is disposed in and fills the opening 14.

Figure 2:
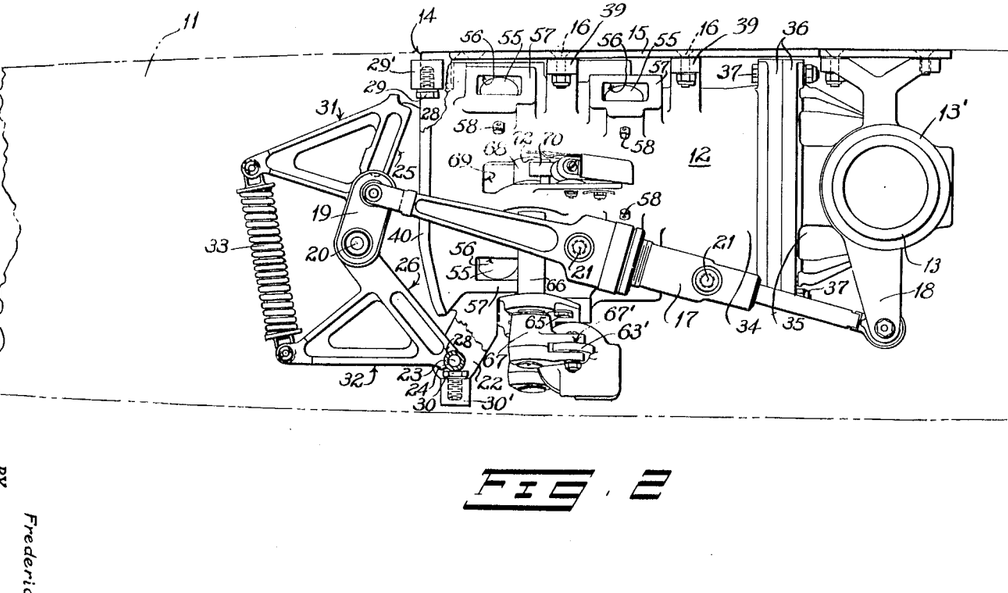
Fig. 2 is a section taken along line 2—2 of Fig. 1 to show a side elevation of the present receiver in its fully closed or retracted position whereby it is disposed entirely within the wing of the aircraft to form a flush continuation of the outer surface thereof and the locking means operative to retain it in this position.
Figure 3:
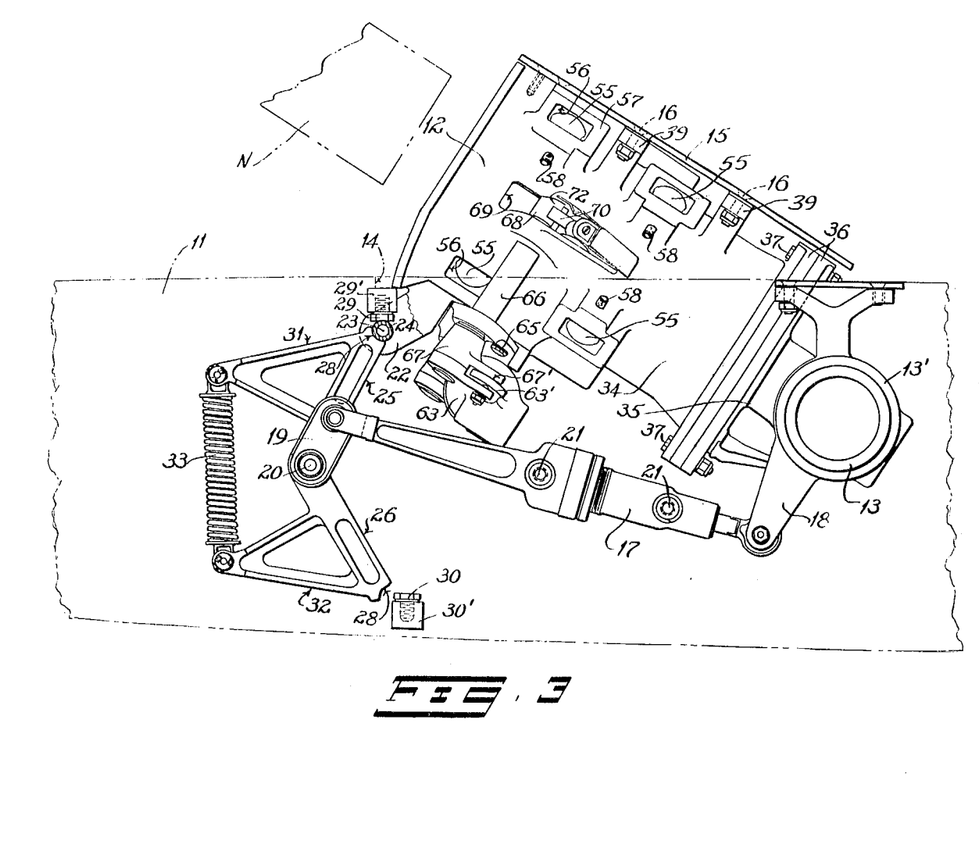
Fig. 3 is a view, like Fig. 2, to show the present receiver in its fully protracted or extended position whereby it is angularly disposed relative to the wing of the aircraft with the locking means operative to maintain it in this position the coacting nozzle being shown in phantom lines.

From the foregoing it is apparent that by rotating or oscillating the journal 13, the receiver 12 may be moved from its position within the wing 11 (Fig. 2) outwardly thereof to a position angular to the wing 11 (Fig. 3). By the reverse operation of journal 13, the receiver 12 may be returned to its position within the wing 11.

In order to effect this operation or rotation of the journal 13, a hydraulic power unit 17 is employed. This power unit 17 is disposed at one side of the receiver 12 and operatively engages the outer end of a torque lever 18, which is fixedly mounted on, so as to project at right angles from, one end of the journal 13. At its opposite end the power unit 17 is similarly connected to another torque lever 19, which is fixedly attached to and projects angularly from a shaft 20 which is rotatably anchored to the airframe in any convenient and suitable manner. This power unit 17 includes conventional inlet and/or outlet or bleed ports 21 on opposite sides of the piston thereof to which appropriate and well-know hydraulic feed lines may be connected in the usual and customary manner to a hydraulic fluid source.

The control mechanism per se by which the operation of the power unit 17 is effected forms no part of the present invention and any standard device may be employed. It is contemplated, however, that it be operative from the cockpit of the airplane for the convenient handling thereof by the operator or pilot. Thus, the pilot may control the expansion and contraction of the power unit 17 for the rotation or oscillation of the journal 13 by which the receiver 12 is respectively retracted within and projected outwardly of the wing 11.

The receiver 12 is further provided with an angularly disposed, bifurcated extension 22 which is immovably secured to the bottom of the receiver at the forward end thereof and located substantially in the plane of the transverse center of the receiver. A fixed pin 23 pierces the outer end of the extension 22 and extends transversely thereacross to receive and support thereon a bearing sleeve 24 located in the space formed by the bifurcation. This bearing sleeve 24 is arranged and adapted for cooperation with the outer ends of a pair of substantially identical levers 25 and 26, each of which is rotatably mounted on the shaft 20 at its other end. These levers 25 and 26 are so mounted on the shaft 20 that the ends 28 thereof and the sleeve 24 all lie in the same plane at all times regardless of their relative rotary positions with respect to the shaft 20.

To this end the associated end of each of the levers 25 and 26 is bifurcated as at 25' and 26', respectively, and the respective ears or projections formed thereby are disposed in end to end overlapping relationship one with the other on the shaft 20. The end of the base wall of each bifurcation 25' and 26' remote from the receiver 12 is formed with a shoulder 25" and 26" respectively which extends outwardly of the respective bifurcation 25' and 26' to create a partial web across each bifurcation. A driving arm 20' is disposed in the space defined by the bifurcations 25' and 26', being secured or keyed centrally of its length to the shaft 20 by suitable means such as a bolt 20" for rotation in unison therewith. This arm 20' terminates in substantially diametrically opposed ends which extend one into each of the bifurcations 25' and 26'. The inner edge of each of these ends of the arm 20' is coextensive with and abuts the shoulder 25" or 26" whereby rotation of the arm in one direction upon operation of the power unit 17 simultaneously drives one or the other of the levers 25 or 26 and rotation of the arm in the other direction simultaneously drives the other of said levers.

At its other end each of the levers 25 and 26 respectively terminates in a cavity 28 having an arcuate bottom or edge surface to receive in abutting engagement therein the bearing sleeve 24 on the receiver extension 22 to maintain and support the receiver either in its fully projected or its fully retracted position. An up-stop 29 and down-stop 30 are each immovably attached to the structure of the airframe, each being secured for example in an individual anchor or plate nut 29' or 30' respectively fixedly secured to the inner surface of the upper or lower skin of the wing 11 in a position to work in opposition to each of the levers 25 and 26 when either of said levers is operatively engaged with the bearing sleeve 24 of the receiver extension 22. In this manner the receiver 12 is fixedly held against all movement relative to the wing 11 of the airplane once it has been located in either its fully extended or fully retracted position by means of and through the operation of the power unit 17, as above described.

The levers 25 and 26 are each formed in the shape of a triangle, two sides of which converge in a direction away from the receiver 12 to create a pair of arms 31 and 32 respectively. Each of these arms 31 and 32 is provided with a transverse aperture adjacent the outer end thereof to receive and mount therein the opposed ends of a compression spring 33. When so assembled the spring 33 tends to constantly rotate the opposed ends of the levers 25 and 26 having the cavities 28 towards each other, i.e. in opposition to the extension of the power unit 17.

From the foregoing it is seen that the operation of the power unit 17 for rotation of the receiver 12 inwardly and outwardly of the aircraft serves to directly rotate one or the other of the levers 25 or 26 while the spring 33 serves to concurrently rotate the other lever 25 or 26 in the same direction whereby the associated surfaces of the arm 20' and the shoulder 25" or 26" of the respective lever 25 or 26 are maintained in abutment one against the other. In this respect the levers 25 and 26 are made to co-act one with the other in the fashion of a single bell-crank lever. As the receiver 12 approaches either of its extreme positions of projection or retraction the bearing sleeve 24 contacts the edge surface of the lever 25 or 26 which is being driven by the spring 33. Continued operation of the power unit 17 moves said lever 25 or 26 in opposition to the action of spring 33 until the bearing sleeve 24 ultimately seats itself in the cavity 28 where it is held under the normal action of the spring 33.

The main body portion of the receiver 12 comprises a forward cylindrical member 34 and a rear member 35 which is integrally formed at its aft end with, to project at right angles from, the journal 13. The members 34 and 35 are both provided with complementary, annular flanges 36 at their abutting ends which are positioned in registration one with the other and immovably secured together, as for example, by a number of bolts 37. The member 34 is provided with a number of integral lugs or lobes 39 or the equivalent at spaced intervals along the top thereof by which said member is fixedly secured to the under or lower surface of the cover plate 15 by the countersunk bolts 16. Thus, the body portion of the receiver 12, composed of members 34 and 35, the journal 13 and the cover plate 15 comprise, in effect, one integral element which has hereinabove been generally designated by the numeral 12.

Figure 4:
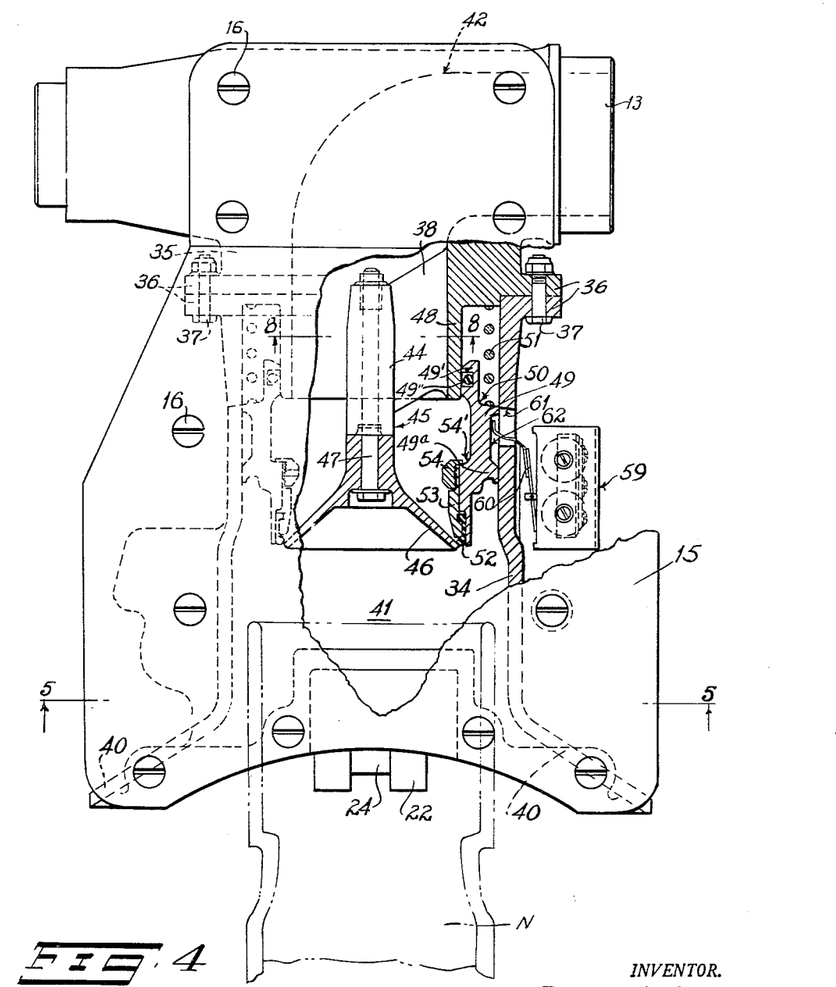
Fig. 4 is a plan elevation of the receiver along with a portion of the outer cover or skin thereof broken away to show partially in section the means by which it is normally closed and sealed against the passage or leakage of fuel from the aircraft and the means associated therewith and actuated thereby to control the locking engagement of the nozzle of the fuel supply line in the receiver, the end of the nozzle being shown in phantom lines.

The cylindrical member 34 terminates at its forward end in an angular or flared lip 40 and is hollow throughout its length to create a passage 41 for the free and unrestricted flow of fuel therethrough. The member 35 is similarly hollow or tubular although of a somewhat smaller diameter than the passage 41 in member 34 with which it is concentrically disposed to form an uninterrupted continuation when the members 34 and 35 are joined as set forth above. At its aft end the passage 41 is in open communication with the interior of the journal 13 which is hollow or tubular, as at 42, for part of its length so as to form an unobstructed continuation of the passage 41 of the receiver 12. Thus, fuel entering the forward or inlet end of the receiver 12, defined by the flared lip 40, may flow substantially freely through the receiver 12, the journal 13 and out its open end as shown in Fig. 4.

The portion of the inner or forward end of the member 35 defining the central passage therein projects outwardly therefrom to be disposed within the associated end of the member 34 to thereby form an integral annular neck 48. The outer surface of the neck 48 is spaced from the inner wall of the member 34. Thus, the effective cross-sectional area of the passage 41 is reduced to the size of the internal diameter of the neck 48, the inner surface of which registers with, and serves as a continuation of the passage 41 in the member 34 and passage 42 in the journal 13.

Concentrically within the neck 48 is a bearing 44 integrally secured to the neck by a web 38, the web and bearing in effect comprising a spider which serves to support a valve element 45. At its outer end the valve element 45 terminates in an outwardly facing, flared cup or valve seat 46 which is disposed in the transverse center of the passage 41. The base of the cup 46 is pierced by a hole which registers with a comparable hole in the bearing 44 to receive therein a bolt 47 by which the valve element 45 is fixedly secured to the spider. To this end the bolt 47 passes through the cup 46 and bearing 44 and is engaged at its outer end by a conventional nut.

Surrounding the annular neck 48 and slidably mounted thereon, is a freely movable collar or sleeve 49 having an effective thickness substantially equal to that of the space defined by the outer surface of the neck 48 and the wall of the member 34. The inner end of the sleeve 49 is recessed, as at 50, to receive one end of a compression spring 51 operable between the outer face of the neck 48 and the bottom wall of the recess 50 whereby the sleeve 49 is constantly urged outwardly on the neck 48. The inner surface of the sleeve 49, adjacent the recessed edge thereof is grooved, as at 49' for the reception therein of an O ring 49" or its equivalent whereby a leak-proof connection is provided between the outer surface of the neck 48 and the abutting inner surface of the sleeve 49.

At its opposed end the sleeve 49 is reduced at and along the inner surface thereof to receive a double O ring seal 52 which is clampingly engaged between this reduced inner surface and a retaining ring 53 coextensive with said reduced inner portion. The retaining ring 53, in turn, is provided with internal threads at its inner end to receive a lock ring-nut 54 the inward end of which overlaps and is received in an offset 54' formed at and along the inner wall of the sleeve for that purpose whereby the ring 53 and seal 52 are secured in place. Thus, the outward movement of the sleeve 49 on the neck 48 is limited by the sealing abutment of the O ring 52 at and around its outer edge against the outer surface of the flared cup 46 of the valve element 45.

From the foregoing it is apparent that the passage 41 in the receiver 12 is normally closed and sealed due to the obstruction therein provided by the cupped end 46 of the valve element 45 together with the outwardly positioned sleeve 49 under the influence of the compression spring 51. When, however, a tubular member, e.g. the nozzle N of a fuel supply line is so inserted in the flared end 40 of the receiver 12, it encircles the valve element 45 and the outer end of the sleeve 49. As the nozzle N is forced inwardly of the receiver 12, it abuts the projecting shoulder 49a of the sleeve 49 and moves the sleeve inwardly on the neck 48 against the normal action of the spring 51. The passage 41 is thereby opened to the extent that fuel may flow from the nozzle N and between the seal 52 at the outer edge of sleeve 49 and the valve element 45 to be delivered to and through passage 42 in the journal 13. By any suitable and desired connections between the journal 13 and the fuel container or tank of the airplane, this fuel delivered to and through the receiver 12 may be delivered to said container or tank to fill or refill the same.

As the nozzle N of the fuel supply line is withdrawn from the receiver 12, the compression spring 51 forces the sleeve 49 outwardly on the annular neck 48 until such time as the outer sealing edge 52 of said sleeve abuts and sealingly engages the wall of the flared end 46 of valve element 45. In this position, the fuel from the tank or container of the airplane or in the lines or passages thereof including passages 41 and 42 is trapped to prevent any leakage.

Figure 5:
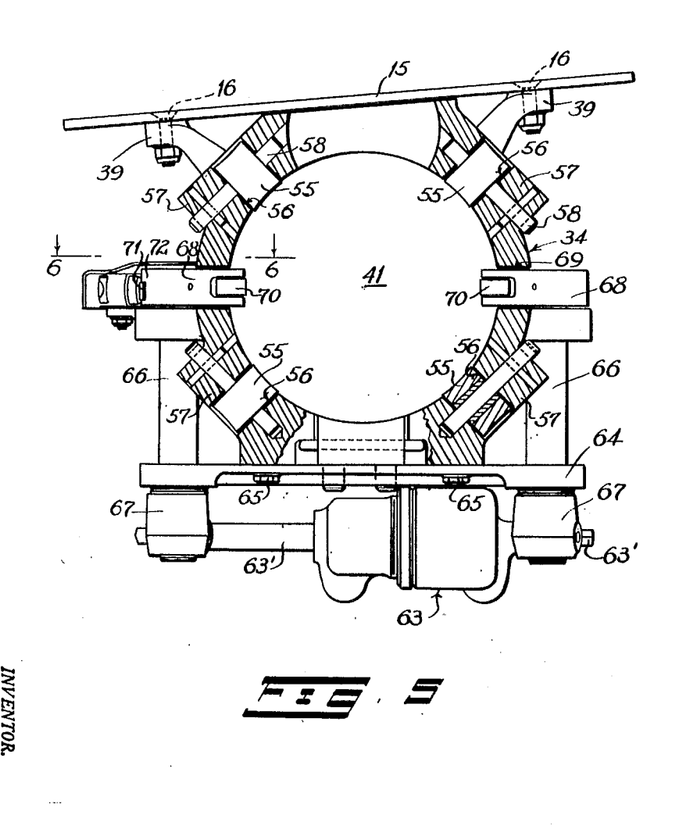
Fig. 5 is a section taken along line 5—5 of Fig. 4 to show the inlet opening in the receiver in which the nozzle of the fuel supply line is inserted and the automatic locking means for engaging said nozzle when operatively inserted therein.
Figure 6:
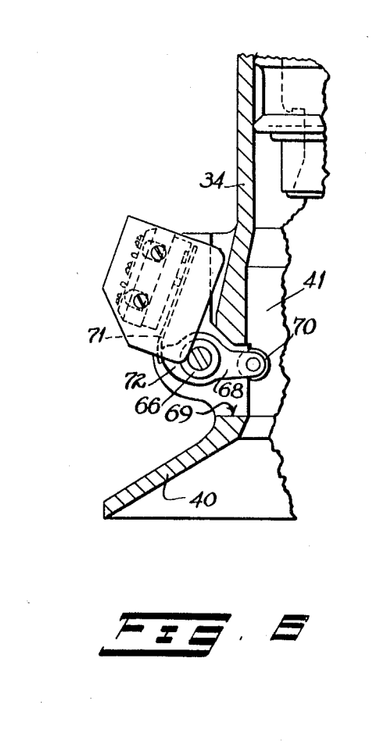
Fig. 6 is a section taken along line 6—6 of Fig. 5 to show the manner in which the means operable in conjunction with the locking means is automatically actuated to signal the pilot when the nozzle of the fuel supply line is properly engaged in the receiver for the transfer of fuel.
Figure 7:
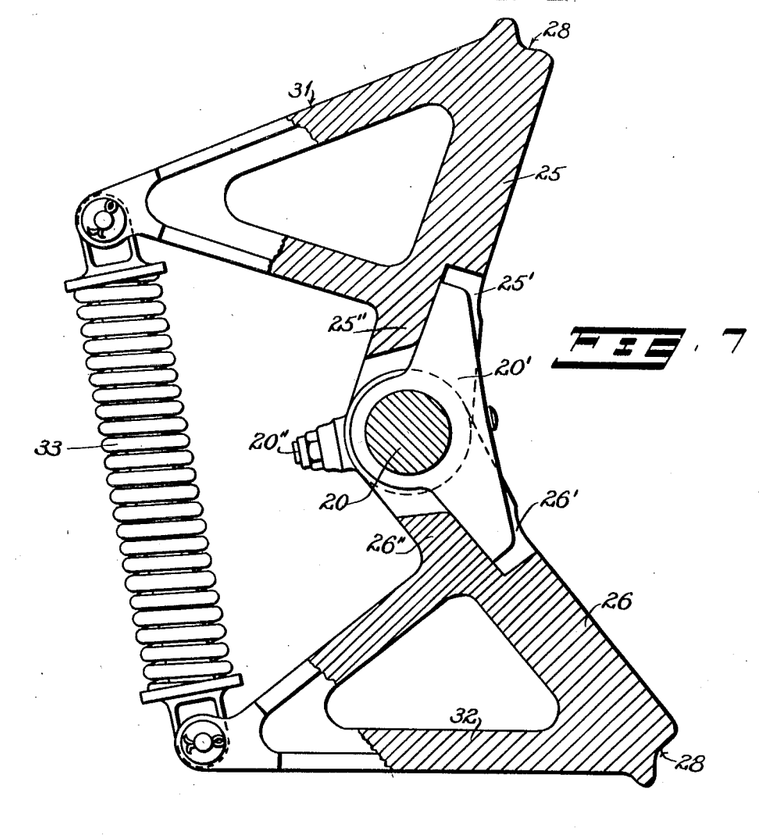
Fig. 7 is a section taken through the means for locking the receiver in its extreme positions of protraction and retraction relative to the wing of the aircraft.
Figure 8:
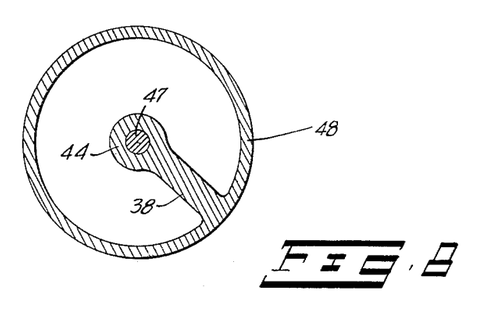
Fig. 8 is a transverse section taken along line 8—8 of Fig. 4.

In order to facilitate the insertion and withdrawal of the nozzle in the receiver 12, the outer cylindrical-shaped member 34 of the receiver is provided with a plurality of rollers 55. A total of eight rollers 55, i.e. a forward set of four and an aftward set of four, each of said sets being coplanar, are illustrated for this purpose. These rollers 55 are each mounted in an aperture 56 which pierces the wall of the member 34 and which is defined by an upstanding or outwardly projecting lug 57 integrally formed on the member 34. Each of the rollers 55 is rotatably mounted on a pin 58 which is secured to the opposed walls of each lug 57 and extends transversely across the associated aperture 56 and relative to the receiver 12 whereby a roller is disposed centrally in each aperture 56 and extends slightly into the passage 41 of the receiver 12, as seen in Fig. 5. Thus, when the nozzle of the fuel supply line is inserted into the inlet or passage 41 of the receiver 12, its outer peripheral surface contacts the working surfaces of the rollers 55 instead of the inner surface of the member 34 to substantially eliminate friction therebetween.

When the nozzle has been operatively inserted in the receiver 12, movement of the sleeve 49 inwardly of the passage 41 against the normal action of the spring 51 as above described serves to actuate an electrical switch 59 which is operatively associated therewith. This switch 59 is fixedly mounted on the exterior of the cylindrical member 34 in any suitable and well-known manner. A contact finger 60 is operatively attached to and extends from the switch 59 to and through an aperture or slot 61 in the wall of the member 34 provided therefor and terminates in a recess or groove 62 provided in the outer surface of the sleeve 49. This recess 62 is of such length as to cause its end to contact and move the finger 60 only when the sleeve 49 has been fully moved inwardly to thereby actuate the switch 59 which energizes the electric circuit controlled thereby.

Operatively connected in the electrical circuit controlled by the switch 59 is a power unit 63, which is mounted for operation transversely of the receiver 12 on the under or lower side thereof. To this end a supporting plate 64 is fixedly mounted to the bottom of the cylindrical member 34 by means of a number of bolts 65. At each of its ends the supporting plate 64 is pierced by an aperture for the passage therethrough of a torque rod 66. Each of the torque rods 66 terminates in an angular lever 67 at its outer end which in turn terminates in a bifurcation 67' to receive the opposite ends or rods 63' of the power unit 63.

At its opposed end each torque arm 66 is provided with an angularly disposed lever or horn 68 which extends, in effect, as an integral part of its respective torque rod 66 in the direction of the member 34 of the receiver 12. The wall of the member 34 is pierced with a slot or opening 69 adjacent each horn 68 to the end that said horn may project internally thereof to be disposed transversely in the passage 41 of the receiver. A roller 70 is rotatably mounted on the outer end of each horn 68 to be received in a peripheral groove provided in the outer wall of the nozzle N of the supply fuel line when said nozzle is fully inserted in the passage 41 of the receiver 12. Thus when the nozzle forces the collar 49 inwardly of the receiver 12 the switch 59 is automatically actuated to protract or extend the power unit 63 causing the torque rods 66 at the ends thereof to be actuated for the rotation of the horns 68 inwardly of the receiver to thereby engage the nozzle of the fuel supply line and lock said nozzle in the receiver 12.

When the refueling of the airplane has been completed and it is desired to remove the nozzle from the receiver 12 the reverse operation of the power unit 63 is effected by an auxiliary or override control operatively connected between the power unit 63 and the cockpit of the airplane. This override control mechanism may be of a conventional and well-known variety and per se forms no part of the subject invention and, therefore, has not been shown lest it confuse and detract from a clear understanding of the invention. Suffice it to say that it is operatively connected to the power unit 63 so that the pilot of the airplane, when his fuel tanks have been refueled through the subject receiver during flight, may actuate the power cylinder 63 to retract or shrink it and thereby rotate the horns 68 for the simultaneous disengagement of the rollers 70 from the nozzle of the fuel supply line.

Since it is desirable that the pilot of the airplane being refueled in flight know when the nozzle of the fuel supply line is operatively engaged in the receiver 12, a separate means is provided which is operable in conjunction with the locking levers or horns 68 to transmit a signal to the cockpit when the horns 68 have been rotated inwardly of the passage 41. This means may, for example, consist of a simple electrical circuit energized by a button switch 71 mounted for operation with one or more of the horns 68. To this end one of the horns 68 is provided with a cam-surfaced extension 72 at its outer end in opposition to the roller 70 whereby rotation of the horn 68 inwardly of the passage 41 concurrently rotates the cam surface against the button switch 71 to energize the circuit and thereby transmit a visual or audible signal to the cockpit.

What is claimed is:

1. The combination with an aircraft component having an opening therein, of a retractable receptacle for the nozzle of a fuel supply line mounted in said component adjacent the aft end of said opening relative to the direction of flight of the airplane comprising a cover adapted to be seated in and substantially fill said opening and having an outer surface conforming to the contour of the component, a fuel inlet assembly secured to the inner surface of said cover, said inlet assembly having a cross-sectional dimension substantially equal to the distance between the cover and the component when the receptacle is disposed in its fully projected position whereby the inner surface of the inlet assembly wall forms a continuation of the external surface of the component forward of the opening, a valve normally closing said inlet assembly including means whereby the valve may be opened by the insertion of the nozzle therein, and actuating means for projecting and retracting said cover and said inlet assembly relative to the component.

2. The combination with an aircraft component having an opening therein, of a retractable receptacle for the nozzle of a fuel supply line normally disposed in said component adjacent the opening comprising a cover adapted to be seated in and close said opening and having an outer surface conforming to the contour of the component, a fuel inlet assembly secured to the inner surface of said cover, a valve normally closing said inlet assembly including means whereby the valve may be opened by the insertion of the nozzle therein, actuating means for projecting said cover and inlet assembly laterally outward of the component and retracting it again into its normal position, and locks connected to the component and operated and controlled by said actuating means for securing said cover and inlet assembly in either the projected or retracted position.

3. In flight refueling the combination with an aircraft component having an opening in its skin, of a retractable receiver for the nozzle of a fuel supply line comprising a cover having its outer surface conforming to the outer contour of the component and normally filling and closing said opening, a normally closed and sealed fuel inlet assembly secured to the inner surface of said cover, a journal rotatably mounted within the component and connected to the cover and inlet assembly, reversible power means connecting said journal to the component and operable to swing the cover and inlet assembly laterally outward of the component and back to its normal position, locking means concurrently operated by said power means to secure the cover and assembly in the respective retracted and projected positions, and means for opening the inlet assembly by the insertion of the nozzle therein.

4. In an aircraft the combination with a wing thereof having an opening in its skin, of a cover for said opening having its outer surface conforming to the outer contour of the wing and disposed in said opening to thereby form an aerodynamically clean continuation of said skin, a journal within the wing adjoining said opening having a passage therein, a fuel inlet assembly secured to the inner surface of said cover and to the journal for swinging movement relative to the wing upon the rotation of said journal, said inlet assembly having a conduit always in communication with the passage in the journal, a valve disposed in said conduit to normally close and seal it against the passage of fuel, a reversible power unit operative between the wing and journal for rotation of the journal whereby the assembly and cover swings outwardly and inwardly of the wing, a lock carried by the wing adjacent the outer end of the assembly and operated by the power unit to engage and secure said assembly in its extreme outward and inward positions relative to the wing, engagement means slidable on the valve in the path of the nozzle when inserted in the conduit of the inlet assembly to be moved thereby and open the valve for the passage of fuel from the nozzle through the conduit to the passage of the journal, and signal means responsive to movement of said engagement means in so opening the valve to indicate the complete insertion of the nozzle in the conduit of the inlet assembly.

5. In an aircraft the combination with a wing thereof having an opening in its skin, of a receiver for the nozzle of a fuel supply line hinged to said wing including a cover having a shape and area conforming to that of said opening and normally disposed in said opening to thereby fill and close the opening and maintain the aerodynamically smooth skin of the wing, said receiver comprising a fuel inlet conduit rotatably mounted internally of the wing, a valve disposed in and normally closing said conduit, a seal effective only when said valve is in its normal position, a reversible power unit connecting said fuel inlet conduit to the wing and operable to move the conduit out of its normal position outwardly of the wing and return said conduit to its normal position, locking means mounted in the wing and connected to said power unit for movement corresponding thereto to release and engage the conduit in moving from and to its extreme positions inwardly and outwardly of the wing, and means accessible only when the conduit occupies its position outward of the wing, whereby the insertion of the nozzle into the receiver opens the valve.

6. In an airplane having a wing with an opening in the upper surface of its skin, the combination with a journal mounted internally of the wing adjacent the aft end of said opening relative to the movement of the airplane in flight, said journal having an internal passage extending from one of its ends to about the center of the length of said journal, a cylindrical member fixedly secured to the journal to project therefrom forward relative to the movement in flight of the airplane, said cylindrical member defining a passage always in communication with the passage in the journal, a cover plate secured to the outer surface of said cylindrical member to normally fill and close said opening and form a continuation of the skin of the wing, a valve operatively disposed in the passage of said cylindrical member, spring-loaded means normally closing and sealing said valve, a reversible power unit connected to the wing and to the journal and operative to rotate said journal and thereby project the cylindrical member and cover out of its normal position, a lock carried by the wing and concurrently operated by said power unit to engage and secure said cylindrical member in position projected from the wing, a projection on the spring-loaded means engageable by the nozzle upon its insertion in the cylindrical member when the latter projects outwardly of the wing whereby said spring-loaded means is moved by such insertion to open the valve, and a lock on the cylindrical member operative in response to movement of the spring-loaded means to engage and secure the nozzle in the cylindrical member against relative movement.

7. A receptacle for the nozzle of a fuel supply line comprising a fuel inlet conduit, a valve assembly disposed in said conduit to normally close and seal it, said valve assembly including slidable means mounted thereon and matingly complemental to said nozzle to receive and engage the nozzle upon its insertion in said conduit whereby the valve assembly is opened, a lock carried by the receptacle and operative to engage and secure the nozzle within the conduit, and an actuator for the operation of said lock disposed in the path of movement of said slidable means.

8. A receptacle for a nozzle of an in-flight refueling supply line comprising an inlet conduit, a valve contained within said conduit to normally close it, a seal carried by said valve and operative when the valve is in its normal position, slidable means mounted on the valve and complemental to the nozzle to receive and engage said nozzle upon its insertion in said conduit for movement thereby to open the valve, electrically actuated means carried by the receptacle and operative to engage and secure the nozzle against movement relative to the conduit, and a normally disengaged contact disposed in the path of movement of said slidable means by the nozzle as aforesaid to energize said electrically actuated means.

9. A receiver for a nozzle comprising an inlet conduit, a valve contained within said conduit to normally close and seal the conduit, said valve including slidable means mounted on the valve for engagement by the nozzle upon its insertion in the conduit whereby the valve is opened, an electrically actuated lock carried by the receptacle to secure the nozzle to the conduit against relative movement, a normally open switch engaged and actuated by said slidable means when moving to open the valve, and a signal-actuating means mounted adjacent said lock automatically operable in response to the operation of said lock.

10. In an aircraft having a wing with an opening in its skin, the combination with a journal mounted within the wing and having an internal passage, a fuel inlet assembly fixed to and projecting at right angles from the journal and opening internally into the passage of said journal, said inlet assembly being adapted to matingly receive the nozzle of a fuel supply line, a cover plate secured to the outer surface of the inlet assembly to normally fill and close said wing opening and form an aerodynamically clean continuation of the outer surface of the wing, means mounted internally of said inlet assembly normally closing and sealing the opening therein including an abutment engageable by said nozzle when inserted in said inlet assembly for movement of said means out of its normal position, a power unit connected to the journal to rotate it whereby the inlet assembly is moved to and from a position where it projects from the wing, a pair of locking levers mounted on a common pivot within the wing, one to engage and lock the inlet assembly in its projected position and the other to engage and lock the inlet assembly in its position within the wing, and means operated by the power unit to move either of said levers to its operative position.

11. In an aircraft having a wing with an opening in its skin, the combination with a journal mounted within the wing adjacent said opening and having an internal passage, a fuel inlet assembly defining a conduit fixed to and extending at right angles from the journal with its conduit opening into the passage of the journal, said inlet assembly being adapted to receive the nozzle of a fuel supply line, a power unit connected to the journal for the rotation thereof whereby the inlet assembly is moved to and from a position where its projects through the opening and laterally outwardly of the wing, a shaft mounted for rotation within the wing, a pair of locking levers mounted for independent movement on said shaft, a connection between the power unit and said shaft for the oscillation thereof in one direction when the inlet assembly is projected from the wing and in the reverse direction when the inlet assembly is retracted into the wing, an engagement common to both levers secured to the shaft for oscillation therewith, said engagement moving one of said levers upon the oscillation of the shaft in one direction and the other of said levers upon the oscillation of the shaft in the opposite direction, locking means carried by each of said levers, and a member secured to and projecting from the inlet assembly to be engaged by either one of said locking means to secure the inlet assembly in its corresponding projected or retracted position.

12. In an aircraft having a wing with an opening in its skin, the combination with a journal mounted within the wing adjacent said opening and having an internal passage, a fuel inlet assembly defining a conduit fixed to and extending at right angles from the journal with its conduit opening into the passage of the journal, said inlet assembly being adapted to receive the nozzle of a fuel supply line, a power unit connected to the journal for the rotation thereof whereby the inlet assembly is moved to and from a position where it projects through the opening and laterally outwardly of the wing, a shaft mounted for rotation in the wing, a pair of locking levers mounted for independent movement on said shaft, engaging means on each of said levers, a member on the fuel inlet assembly to cooperate with the engaging means of either of said levers whereby the inlet assembly is locked in either its projected or its retracted position, a driving connection between the power unit and the shaft for the rotation of said shaft in either direction, an engagement common to both levers secured to the shaft for oscillation therewith, said engagement moving one of said levers to locking position upon the rotation of the shaft in one direction and moving the other said lever to locking position upon the rotation of the shaft in the reverse direction, and means interposed between said levers for maintaining the common connection between the shaft and said levers always in cooperation with both of the levers and operating to oppose the operation of said power unit.

13. In an aircraft the combination with a wing thereof having an opening in its skin, of a retractable receiver for the nozzle of a fuel supply line comprising a journal mounted in the wing and having an internal passage therein, a fuel inlet assembly defining a conduit opening into the passage in the journal, said inlet assembly being fixedly secured to and extending at right angles from the journal for movement in unison therewith and adapted to matingly receive the nozzle in its conduit, a power unit within the wing to oscillate the journal whereby the inlet assembly moves to and from a position projecting laterally outwardly from the wing through the opening in its skin, a shaft within the wing adjacent the inlet assembly, a pair of levers loosely mounted on the shaft, a connection between the shaft and power unit whereby operation of said power unit oscillates the shaft, means fixed to the shaft for oscillation in unison with it and projecting from the shaft to engage one of said levers at all times and swing said engaged lever with the shaft, an extension on the inlet assembly complemental to coacting means carried by each lever for locking engagement by either one of said levers to secure the assembly against movement relative to the wing, and a lock carried by the inlet assembly for engagement with the nozzle when inserted therein to automatically secure the nozzle against relative movement.

References Cited in the file of this patent

UNITED STATES PATENTS

| | | |
|---|---|---|
| 1,848,372 | Moran | Mar. 8, 1932 |
| 2,116,960 | Brown et al. | May 10, 1938 |
| 2,123,295 | Wood | July 12, 1938 |
| 2,207,724 | Diehl | July 16, 1940 |
| 2,242,201 | Woods | May 13, 1941 |
| 2,307,427 | Smith et al. | Jan. 5, 1943 |
| 2,458,245 | Bordelon | Jan. 4, 1949 |
| 2,473,792 | Fontaine | June 21, 1949 |
| 2,570,534 | Erny | Oct. 9, 1951 |
| 2,582,609 | Steele | Jan. 15, 1952 |
| 2,692,102 | Cobham et al. | Oct. 19, 1954 |
| 2,692,103 | Cobham et al. | Oct. 19, 1954 |
| 2,728,590 | MacGregor | Dec. 27, 1955 |